US008459658B2

(12) United States Patent
Cycon

(10) Patent No.: US 8,459,658 B2
(45) Date of Patent: Jun. 11, 2013

(54) HAND-HELD POWER TOOL WITH A CHUCK AND AN ASSOCIATED WORKING TOOL

(75) Inventor: Alexander Cycon, Ispringen (DE)

(73) Assignee: Hilti Aktiengesellschaft, Schaan (LI)

( * ) Notice: Subject to any disclaimer, the term of this patent is extended or adjusted under 35 U.S.C. 154(b) by 1237 days.

(21) Appl. No.: 12/313,553

(22) Filed: Nov. 21, 2008

(65) Prior Publication Data

US 2009/0145620 A1 Jun. 11, 2009

(30) Foreign Application Priority Data

Nov. 23, 2007 (DE) ......................... 10 2007 056 531

(51) Int. Cl.
*B23B 31/107* (2006.01)

(52) U.S. Cl.
USPC ............. 279/19.6; 279/19; 173/132; 173/128

(58) Field of Classification Search
USPC ................. 279/19, 19.3, 19.6, 19.7, 19.4, 80, 279/82, 904, 905, 155
See application file for complete search history.

(56) References Cited

U.S. PATENT DOCUMENTS 2,158,529 A * 5/1939 Slater ........................... 279/19.3
2,608,180 A * 8/1952 Curtis ........................... 173/132
2,608,413 A * 8/1952 Peck ............................... 279/19
2,889,811 A * 6/1959 Guillemier .................... 173/210
2,959,943 A * 11/1960 Allen ............................ 464/158
4,184,692 A 1/1980 Beason et al.
4,655,651 A 4/1987 Hanger et al.
4,691,929 A * 9/1987 Neumaier et al. ........... 279/19.3
4,830,549 A 5/1989 Neumaier et al.
5,111,890 A * 5/1992 Ranger et al. ................. 173/104
5,437,465 A * 8/1995 Vogele et al. .................... 279/22
5,558,478 A * 9/1996 Odendahl et al. ............. 408/226
5,603,516 A * 2/1997 Neumaier ..................... 279/19.5
5,709,391 A * 1/1998 Arakawa et al. ............. 279/19.4
5,971,403 A * 10/1999 Yahagi et al. ................ 279/19.3
6,467,555 B2 * 10/2002 Plank et al. .................... 173/201
6,578,644 B2 * 6/2003 Frenzel et al. ................ 173/128
6,971,455 B2 * 12/2005 Shibata et al. .................. 173/48
7,252,155 B2 8/2007 Goetzfried et al.
7,819,203 B2 * 10/2010 Sato et al. ..................... 173/210
2003/0098168 A1 5/2003 Frauhammer et al.
2005/0271487 A1 12/2005 Kleine et al.

FOREIGN PATENT DOCUMENTS

CH 556 719 12/1974
CH 642 580 4/1984
DE 10 206 046 472 4/2008

* cited by examiner

*Primary Examiner* — Eric A Gates
*Assistant Examiner* — Paul M Janeski
(74) *Attorney, Agent, or Firm* — Abelman, Frayne & Schwab

(57) ABSTRACT

A hand-held power tool for at least percussively driving a working tool (2) along a percussion axis (A) and including a chuck (4) for receiving the working tool (2) and including a receiving sleeve (6, 6') fixedly connected with the chuck (4) for joint rotation therewith and for limited axial displacement relative thereto, at least one locking member (7) radially displaceably supported in the receiving sleeve (6, 6') for axially securing therein a shank (3, 3') of the working tool (2) insertable in to the receiving sleeve (6, 6'), and an axially extending anvil (8) securable in the receiving sleeve (6, 6') for closing a power tool side end of the receiving sleeve (6, 6').

9 Claims, 3 Drawing Sheets

HAND-HELD POWER TOOL WITH A CHUCK AND AN ASSOCIATED WORKING TOOL

BACKGROUND OF THE INVENTION

1. Field of the Invention

The present invention relates to a hand-held power tool for at least percussively driving a working tool along a percussion axis and including a chuck, in particular, to hammer drill or chisel hammer.

2. Description of the Prior Art

Usually, in percussion hand-held power tools with an optionally rotatable, drive spindle, a chuck is secured on the spindle or, according to German Publication DE 37 20 512, is formed directly thereon.

In the chuck according to German Publication DE 37 20 512, a shank of a working tool, which is received in the receiving sleeve, has elongate locking grooves which are closed at both their axial sides and into which a radially displaceable locking member radially engages. The elongate locking grooves in cooperation with the locking member provide for a limited axial displacement of the working tool shank and, thereby, of the working tool. The shank is connected with the receiving sleeve for joint rotation therewith by axially and extending radially inwardly rotation-transmitting webs which are provided on the inner surface of the receiving sleeve and which engage in associated rotation-transmitting grooves provided on the shank. A percussion piston, which is driven by a pneumatic percussion mechanism applies blows to an axially displaceably supported anvil that, in turn, applies blows to the power tool side end surface of the shank.

European Publication EP 1 604 763 discloses a percussion hand-held power tool in which a one-piece pot-shaped anvil, which is open at its working tool side, is mounted on the drive spindle for joint rotation therewith and for a limited axial displacement relative thereto. The shank of the working tool is secured in the anvil again for joint rotation therewith and for a limited relative displacement relative thereto. The shank is flushed by a flushing liquid before the flushing liquid penetrates, at the end side, in the flushing bore of the working tool. The flushing fluid and seals, which are arranged between the movable parts, prevent penetration of abrasive dust to a most possible extent. This solution, which is optimal for a mining operation is not suitable for a dry standard use in the constructional industry.

U.S. Pat. No. 4,184,692 discloses a chuck of a power drill and connected with the drive spindle and in which a cylindrical shank of a drill, which is received in the chuck, is provided with a spherical dimple in which a radially displaceable locking ball engages for securing the shank and, thereby, the drill in the chuck against axial and rotational displacements relative to the chuck.

An object of the present invention is a percussion hand-held power tool having a chuck with which penetration of dust is prevented to a most possible extent.

Another object of the invention is a dust-tight chuck for a percussion hand-held power tool.

A further object of the present invention is to provide a working tool insertable in the inventive chuck.

SUMMARY OF THE INVENTION

These and other objects of the present invention, which will become apparent hereinafter are achieved by providing a hand-held power tool for at least percussively driving a working tool along a percussion axis and including a chuck for receiving the working tool and having a receiving sleeve fixedly connected with the chuck for joint rotation therewith and for limited axial displacement relative thereto and open at least at one of its opposite ends, at least one locking member radially displaceably supported in the receiving sleeve for axially securing therein a shank of the working tool insertable in to the receiving sleeve, and an axially extending anvil securable in the receiving sleeve for closing a power tool side end of the receiving sleeve.

With an anvil closing the power tool side end of the receiving sleeve, both the receiving sleeve and the anvil are closed together in a pot-shaped manner. This prevents penetration of dust in the interior of the power tool.

Advantageously, the anvil is fixedly secured in the receiving sleeve by interference fit, e.g., by being shrinked, or by material-locking connection with glue, soldering, e.g. Thereby a rigidly assembled body can be produced technologically easy.

Alternatively, the anvil can be elastically secured in the receiving sleeve by an elastic intermediate layer, e.g., by vulcanization. Thereby, the blow pulses applied to the free end of the anvil are decoupled from the receiving sleeve to a most possible extent and, thereby, almost completely transmitted to the working tool.

According to another alternative, the anvil and the receiving sleeve are formed as a one-piece part of a common workpiece of a same material. Thereby the one-piece part can be economically and simply produced by, e.g., stamping.

Advantageously, the working tool side end surface of the anvil is spherical, whereby a position-tolerant control pulse can be applied to the shank of the working tool which is received in the receiving sleeve.

Advantageously, the receiving sleeve forms, at its power tool side, on its radially outer surface, axially and radially extending rotation-transmitting wings engageable in correspondingly adapted, associated grooves formed in a drive spindle of the power tool. Thereby, the receiving sleeve is connected with the drive spindle for joint rotation therewith and for a limited axial displacement relative thereto.

Advantageously, the anvil forms, on its radially inner surface, axially and radially extending rotation-transmitting wings engageable in correspondingly adapted, associated grooves formed in a shank of the working tool. Thereby, the shank and, thus, the working tool is connected with the receiving sleeve for joint rotation therewith.

Advantageously, the at least one locking member, which is radially displaceably supported in the receiving sleeve for axially securing therein a shank of the working tool insertable into the receiving sleeve, is formed as a locking ball. In case the associated locking recess in the shank is formed as an elongate groove, the working tool is axially displaceable, within limits, relative to the receiving sleeve. In case the shape of the locking recess corresponds to the shape of the locking member and is formed, e.g., as a spherical cap, in case the locking member is formed as a locking ball, the working tool is axially fixed in the receiving sleeve.

Advantageously, a stop member, preferably a stop sleeve, is arranged radially outwardly of the locking member. Thereby, locking of the working tool in the receiving sleeve can be stopped.

Advantageously, there is further provided spring means for resiliently preloading stop member against the receiving sleeve. Thereby, the stop member is self-locking. Preferably, the spring means is formed as a helical spring.

Advantageously, the axially displaceable, within limits, receiving sleeve is dust-tightly sealed against the drive spindle by sealing means. Further, advantageously, the sealing means is formed as a diaphragm seal having at least one drape. This provides for a trouble-free, sufficiently large axial displacement of the receiving sleeve.

Advantageously, the sealing means is secured with its one end to a spring cap that is itself dust-tightly secured on the receiving sleeve, e.g., by an O-ring. This permits to reduce the axial length of the chuck.

A working tool to be received in a chuck of a hand-held power tool, which has a receiving sleeve fixedly connected with the chuck for joint rotation therewith and for limited axial displacement relative thereto, and at least one locking member radially displaceably supported in the receiving sleeve, includes a shank receivable in the receiving sleeve of the chuck, and having a locking recess spaced from an end surface of the shank by a distance amounting to a tripple of a shank diameter and into which the locking member of the chuck is extendable for axially securing the shank in the chuck receiving sleeve. The locking recess can be formed, in particular, as a spherical cap recess or as a circular radial groove extending over at least a portion of the shank circumference. The locking recess permits to axially secure the driven (even percussively) working tool. The transmission of blow pulses itself does not require practically any limited axial displacement of the shank, rather the clearance of the formlocking connection between the locking member and the locking recess already provides for a sufficient displacement. This also contributes to the dust-tightness of the power tool because a creeping dust carry-over increases with the amplitude of the axial movement and vice versa.

Advantageously, the shank has at least one rotation-transmitting groove open at one end. This permits to transmit a high torque to the working tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
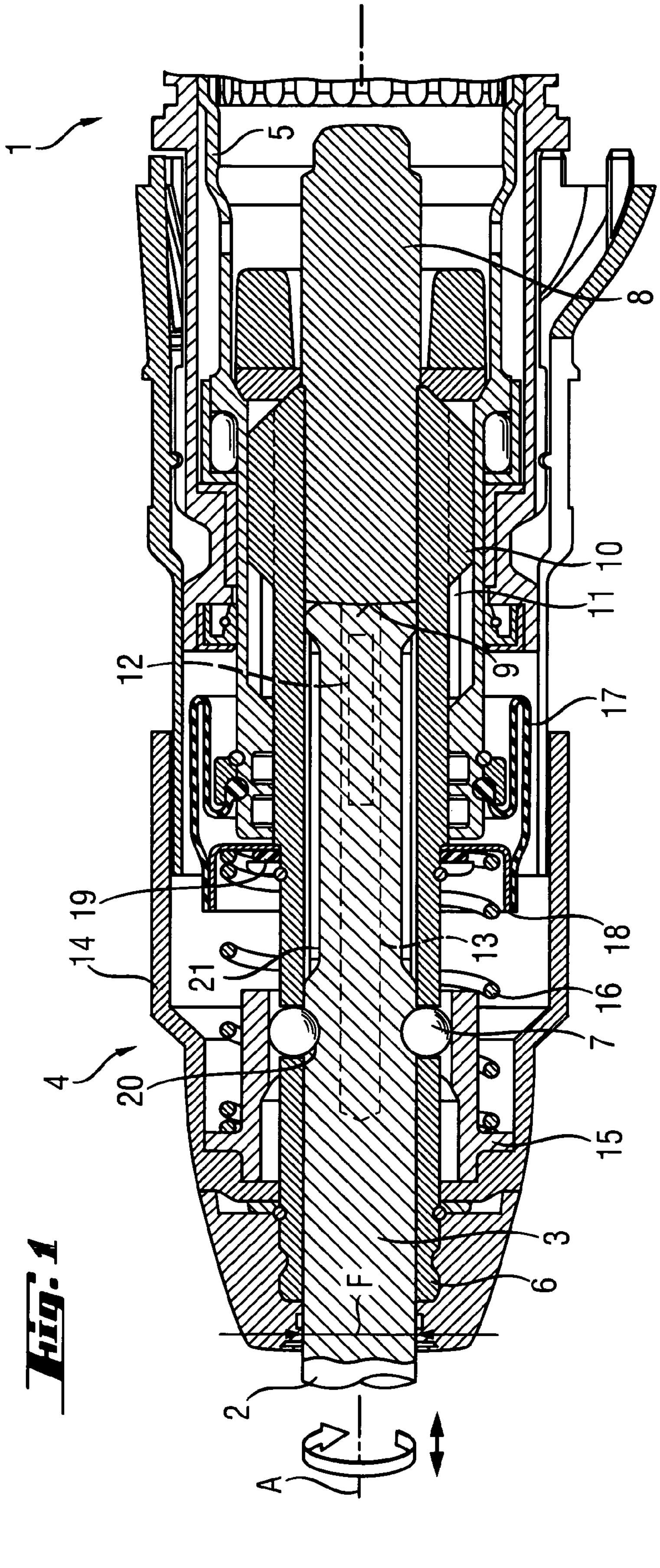
FIG. 1 a cross-sectional longitudinal view of a chuck according to the present invention for a hand-held power tool, with a working tool received in the chuck.

A hand-held power tool 1, which is shown in FIG. 1 and which percussively and rotatably drives a working tool 2 along a percussion axis, includes a chuck 4 for receiving the working tool 2, and a drive spindle 5 for driving the chuck 4. The chuck 4 has a receiving sleeve 6 open at its working tool side and connected with the chuck 4 for a joint rotation therewith and for a limited axial displacement relative thereto. The shank 3 of the working tool 2, which is inserted into the receiving sleeve 6, is axially secured therein with radially displaceable locking members 7. At its power tool side, the receiving sleeve 6 is closed with an anvil 8 that projects axially from the power tool 1 and extends into the receiving sleeve 6. The anvil 8 is secured in the receiving sleeve 6 by shrinking that produces an interference fit. The working tool side end surface 9 of the anvil 8 has a spherical profile. At its power tool side, the receiving sleeve 6 forms projecting radially outwardly, axially and radially extending, rotation-transmitting wings 10 engaging in adapted thereto, associated spindle grooves 11 of the drive spindle 5. In addition, the receiving spindle 6 forms projecting radially inwardly, radially and axially extending rotation-transmitting webs 12 engaging in adapted thereto, associated rotation-transmitting grooves 13 formed in the shank 3 of the working tool 2. At least one radially displaceable locking member 7, which is formed as a locking ball, extends in the receiving sleeve 6 for axially securing the shank 3 of the working tool 2 and, thereby, for axially securing the working tool 2. A manually actuated stop member 15 in form of a stop sleeve is associated with the locking member 7 and is located radially outwardly with respect thereto. The stop member 15 is preloaded against the receiving sleeve 6 by a spring member 16 in form of helical spring. A sealing member 17 in form of diaphragm seal with an axial drape dust-tightly seals the axially displaceable, within certain limits, receiving sleeve 6 relative to the drive spindle 5. One end of the sealing member 17 is secured to a cap 18 of the spring member 16 which, in turn, is dust-tightly secured on the receiving sleeve 6 with an O-ring 19. The substantially cylindrical shank 3 of the working tool 2, which is received in the chuck 4, has two locking recesses 20 in form of spherical cap recesses suitable for formlocking receiving the locking members 7 in form of locking balls, for axially securing of the shank 3 in the receiving sleeve 6 with the two locking members 7. The locking recesses 20 are spaced from the end surface of the shank 3 by a distance equal four (4) diameters of the shank 3. In addition, the shank 3 of the working tool 2 has two rotation-transmitting grooves 13 extending from the end surface of the shank 3 and open thereat and in which the rotation-transmitting webs 12 of the receiving sleeve 6 formlockingly engage. For compatibility reasons, the shank 3 has two additional elongate locking grooves 21 that are spaced from the end surface of the shank 3 by a distance up to two and a half diameter F of the shank 3 but which do not perform any function in the chuck 4.

Figure 2:
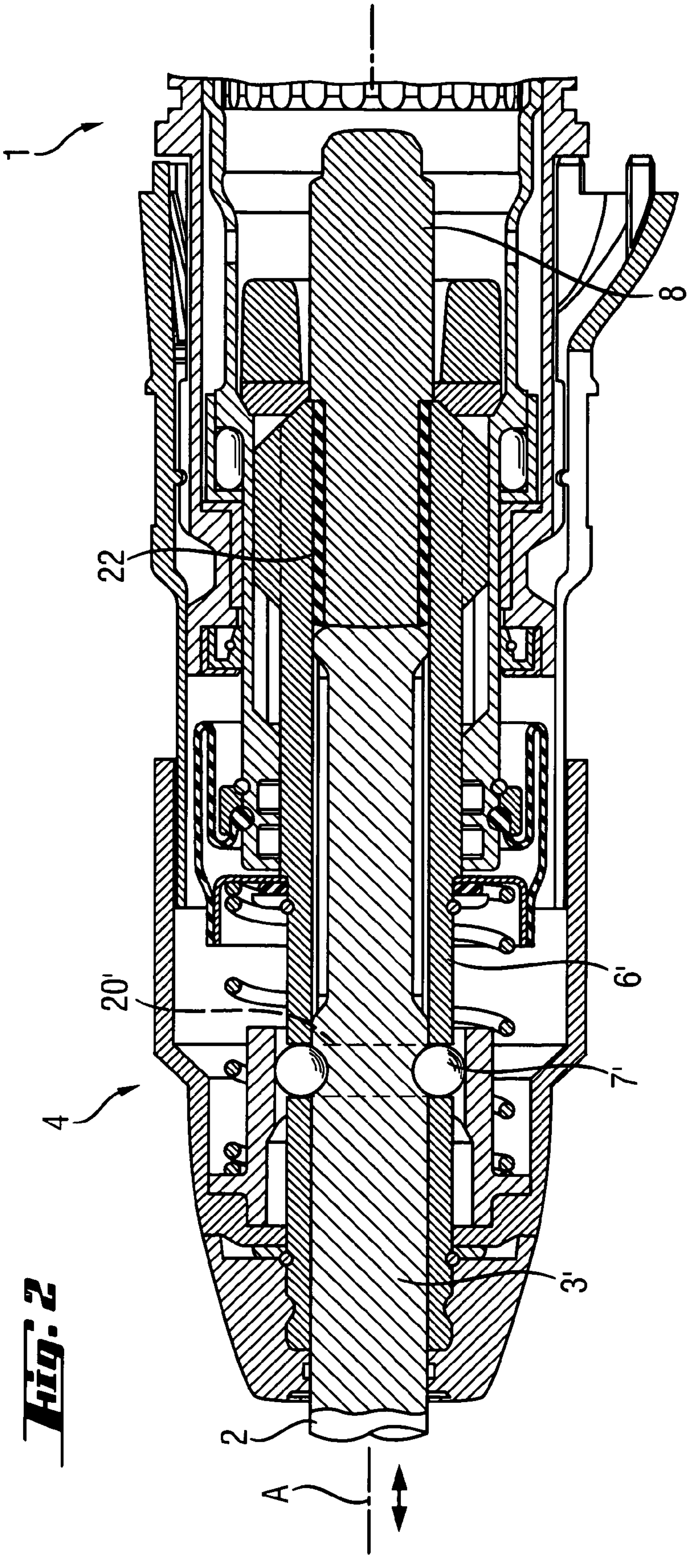
FIG. 2 a view similar to that of FIG. 1 of another embodiment of the inventive chuck.
Figure 3:
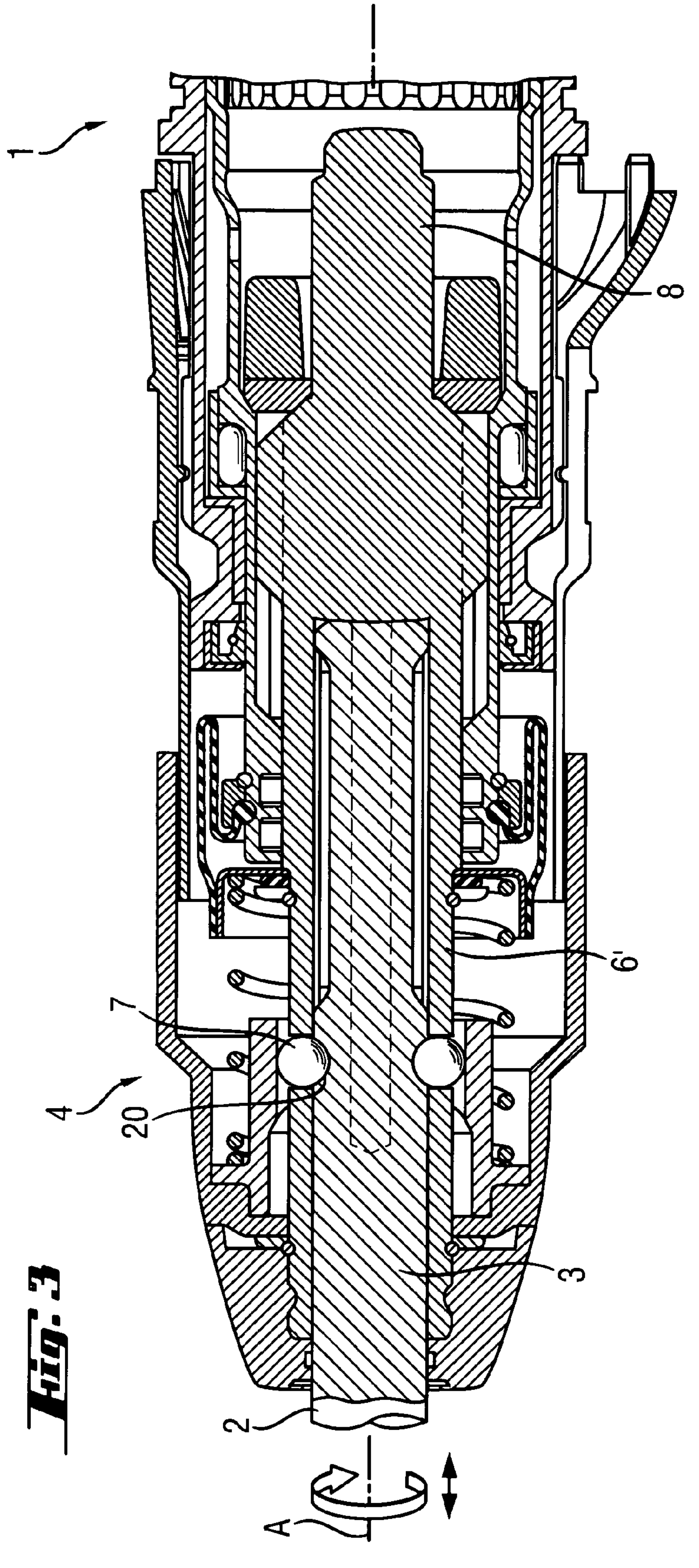
FIG. 3 a view similar to that FIGS. 1-2 of yet another embodiment of the inventive chuck.

The chuck shown in FIG. 2 differs from that of FIG. 1 in that the chuck 4 is elastically secured in the receiving sleeve 6' (without rotation-transmitting webs 12 in FIG. 1) by an elastic intermediate layer 22 in form of vulcanized silicone rubber. The locking recess 20' for axially formlocking receiving the two locking members 2 in form of locking balls is formed as a circumferentially extending, circular radial groove. No rotation is transmitted to the shank 3' of the working tool 2, by any rotation transmitting elements of the sleeve 6 itself. The chuck 4 shown in FIG. 3 differs from that of FIG. 1 in that the projecting anvil 8 and the receiving sleeve 6', which opens at one side, are formed as a one-piece part of a single workpiece of the same material. The rotation of the shank 3, which is located in the receiving sleeve 6' (without rotation-transmitting webs 12 from FIG. 1) is effected exclusively by the locking members 7 engaging in locking recesses 20 of the shank 3 in which the locking members 7 are formlockingly received.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A chuck for a hand-held power tool and designed for receiving a working tool (2) comprising a receiving sleeve (6, 6') fixedly connected with the chuck (4) for joint rotation therewith and for limited axial displacement relative thereto and open at least at one of opposite ends thereof; at least one locking member (7) radially displaceably supported in the receiving sleeve (6, 6') for axially securing therein a shank (3, 3') of the working tool (2) insertable in to the receiving sleeve (6, 6'), and an axially extending anvil (8) fixedly elastically securable in the receiving sleeve (6, 6') by an elastic intermediate layer for closing a power tool side end of the receiving sleeve (6, 6').

2. A hand-held power tool for at least percussively driving a working tool (2) along a percussion axis (A), comprising a chuck (4) for receiving the working tool (2) and including a receiving sleeve (6, 6') fixedly connected with the chuck (4) for joint rotation therewith and for limited axial displacement relative thereto and open at least at one of opposite ends thereof; at least one locking member (7) radially displaceably supported in the receiving sleeve (6, 6') for axially securing therein a shank (3, 3') of the working tool (2) insertable in to the receiving sleeve (6, 6'), and an axially extending anvil (8) fixedly securable in the receiving sleeve (6, 6') for closing a power tool side end of the receiving sleeve (6, 6'), wherein the anvil (8) is fixedly elastically secured in the receiving sleeve (6') by an elastic intermediate layer (22).

3. A hand-held power tool according to claim 2, wherein the anvil (8) is fixedly secured in the receiving sleeve (6') by vulcanization.

4. A hand-held power tool according to claim 2, wherein the receiving sleeve (6, 6') forms, at a power tool side thereof, on a radially outer surface thereof, axially and radially extending rotation-transmitting wings (10) engageable in correspondingly adapted, associated grooves (11) formed in a drive spindle (5) of the power tool.

5. A hand-held power tool according to claim 2, wherein the anvil (8) is fixedly secured in the receiving sleeve (6) forms, on a radially inner surface thereof, axially and radially extending rotation-transmitting wings (12) engageable in correspondingly adapted, associated grooves (11) formed in a shank (3) of the working tool (2).

6. A hand-held power tool according to claim 2, wherein the chuck (4) further includes a stop member (15) arranged radially outwardly of the locking member (7).

7. A hand-held power tool according to claim 6, wherein the chuck (4) further includes spring means (16) for resiliently preloading the stop member (15) against the receiving sleeve (6).

8. A hand-held power tool according to claim 6 wherein the chuck (4) further includes means (17) for dust-tightly sealing the receiving sleeve (6, 6') against a drive spindle (5) of the power tool.

9. A hand-held power tool according to claim 8, wherein the sealing means (17) is secured with one end thereof to a spring cap (18) that is itself dust-tightly secured on the receiving sleeve (6, 6').

* * * * *